April 18, 1961    E. O. ROBERTSON ET AL    2,980,896
ICING DETECTORS

Filed Oct. 30, 1958    2 Sheets-Sheet 1

INVENTORS
ERNEST O. ROBERTSON
JAMES R. STALLABRASS
DONALD L. BAILEY
BY Smart + Biggar
ATTORNEYS

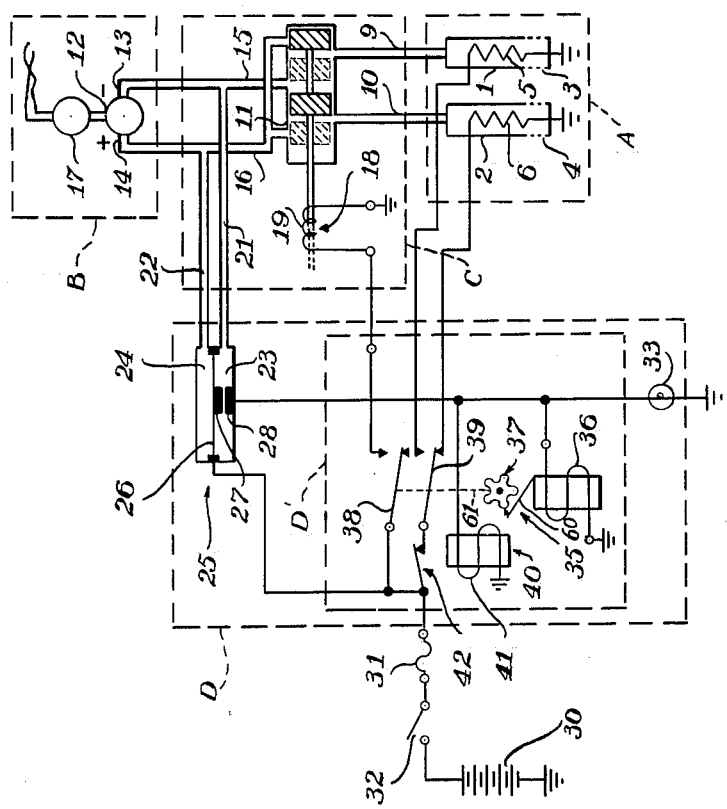

# United States Patent Office 2,980,896
Patented Apr. 18, 1961

2,980,896

ICING DETECTORS

Ernest O. Robertson, James R. Stallabrass, and Donald L. Bailey, Ontario, Canada, assignors to National Research Council, Ottawa, Ontario, Canada, a body corporate of Canada Filed Oct. 30, 1958, Ser. No. 770,811

Claims priority, application Canada May 22, 1958

8 Claims. (Cl. 340—234)

This invention relates to orifice-type icing detectors which are non-directional and which are suitable for use in air speeds down to zero. Devices of this nature are necessary for icing detection with respect to static or slow moving ground and waterborne installations, such as radar stations, electricity installations and ground meteorological stations and are also required for VTOL aircraft, such as helicopters, wherein the magnitude and direction of air speed is subject to wide and rapid variation.

Icing detectors are known wherein two orifice-type probes are used, one being a detector probe having orifices adapted to be progressively blocked by ice when impinged upon by air in an ice producng atmosphere and the other being a reference probe whose orifices are kept free of ice by, for instance, an electrical heater. When, with this arrangement, the detector probe orifices become blocked by ice the pressure differential between the probes actuates a switch which in turn controls an indicating device and/or de-icing apparatus. This general principle has, with modifications, been made applicable to icing detector installations capable of performing satisfactorily under conditions where the direction and magnitude of air flow is subject to wide variations. In the copending application 587,041, filed May 24, 1956, now Patent 2,914,755, an icing detector is disclosed wherein, by means of a vacuum pump, air is drawn in through the orifices of both the detector and reference probes in such a way that when the former becomes blocked with ice the pressure differential between the probes causes actuation of an indicator device and, if desired, de-icing equipment. Resort to this expedient enables realization of icing detector apparatus which is substantially independent of the direction and magnitude of air flow impinging upon the probes in so far as such air flow is attributable to wind or movement of the surface on which the detector and reference probes are mounted.

It is a principal object of the present invention to effect certain improvements in non-directional icing detectors of the orifice-type where two such detectors, when subjected to atmosphere conducive to ice formation, are arranged continuously to pass through a cycle of operation wherein the probes mutually alternate between operating conditions in which one of the probes is a detector probe and the other probe is a reference probe, the arrangement thereby established yielding a fresh determination of icing conditions at more or less equal intervals of the time during which icing conditions are encountered.

It is another object of this invention to provide icing detector apparatus of a relatively simple construction which is useful for indicating icing conditions on surfaces with respect to which there are wide fluctuations in the magnitude and direction of air flow and which will automatically perform a series of separate tests to determine the continued existence of icing conditions at more or less equal intervals of time through the period during which icing conditions are encountered.

According to the present invention two (preferably) identical, orifice-type icing detector probes are connected to the inlet and outlet ports of a vacuum pump through a reversing valve which permits the air flow in the pneumatic circuit thereby formed to be reversed. Pneumatic and electrical circuitry, including pressure differential sensitive switching means, are provided whereby, when the orifices of the probe for the time being connected to the inlet port of the pump become blocked with ice, (a) the reversing valve is actuated to reverse the connections between the probes and the ports, (b) an electric heater means associated with the probe connected to the inlet port just prior to such reversal is energised to cause de-icing of the probe and (c) an icing indicator and/or de-icing equipment is energised. A cycle of operation is thereby established which will continue throughout the time during which the probes are subjected to atmosphere conducive to ice formation.

A number of important advantages may be claimed for this arrangement. Firstly, an extremely sensitive icing detector has been provided which is substantially independent of changes in direction and magnitude of air flow over the surfaces on which the probes are mounted. Secondly, the apparatus yields a series of fresh determinations of the existence of icing conditions during the period throughout which ice-producing atmosphere is encountered. Thirdly, an icing detector has been provided which will anticipate icing conditions by virtue of the fact that the ice sensing probe will be artificially cooled by the expansion of air through orifices therein, thus enabling the detector to sense impending icing conditions at temperatures just above freezing level. Fourthly, an icing detector has been provided which will anticipate icing conditions at temperatures below freezing and relative humidities approaching, but less than 100%, by virvirture of condensation of water due to a temperature drop at the orifices of the ice sensing probe attributable to expansion therein caused by the detector itself. Finally, an icing detector according to the invention may be used as an ice accretion meter in that, during the cooling period of the probe after de-icing, this same probe is not required to sense ice, and will therefore cool to approximately ambient temperature before being required so to do.

The invention will be described with reference to the attached figures of drawings wherein:

Figure 4 illustrates in detail the pneumatic and electrical circuitry used for one embodiment of the invention.

Figure 1:
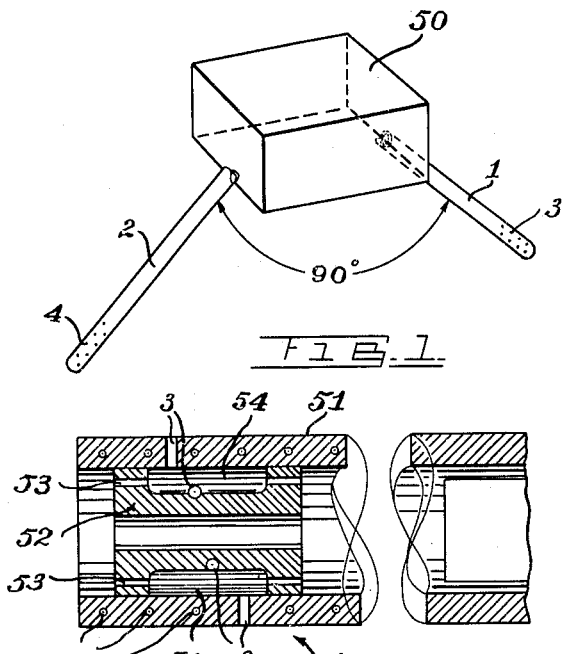
Figure 1 illustrates a suitable mounting arrangement for the two orifice-type detector probes used in the invention.

Referring now to Figure 1, there is there shown a pair of orifice-type icing detector probes 1 and 2 which extend downwardly and outwardly, at an angle of about 90° from each other, from the corners of a housing 50. The downward orientation is designed to assist drainage of moisture from the system and reduce the possibility of drawing moisture into the system. It also helps to make sure, when the iced probe is heated and the ice is shed, that the ice will fall clear of the instrument and not lodge around the base of the probe as would be the case if the probe is mounted so that it points upwards; in this latter case the ice might build up and possibly result in shielding of the probes from the icing conditions.

Orientation of the probes at 90° to each other is resorted to since, in some applications, it may tend to reduce the tendency of the probes mutually to shield one another. If desired heaters can be installed on the surface of the housing 50 to prevent build-up of snow or ice thereon which could mask probes 1 and 2 from the icing cloud.

Each of the probes 1 and 2 is provided with a series of orifices 3 and 4 respectively evenly spaced about the circumference of the probes adjacent the ends thereof. These orifices are in each case adapted to become progressively blocked with ice when air from atmosphere conducive to icing conditions is sucked in through the orifices.

Figure 2:
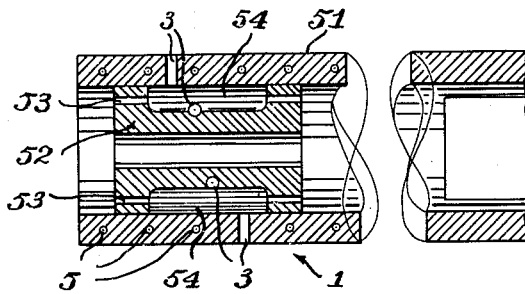
Figure 2 illustrates a form of orifice-type detector probe which is suitable for use in the present invention.

The precise form of orifice-type detector probe used for the invention can be any one of a number of different designs. One kind of probe which has been found particularly advantageous when used with the present invention is shown in more detail in Figure 2. The probe generally represented at 1 is cylindrical in shape and comprises a tubular body member 51 through which pass a plurality of orifices 3 evenly distributed around the circumference of the tubular member adjacent the outer end thereof. Within the walls of the tube may conveniently be located heater wires 5 which are adapted, when energised, to de-ice the probe. A particularly advantageous feature of the probe shown in Figure 2 is the provision of a baffle 52 located on the inside of the probe, which baffle has longitudinal air passages 53 leading into open spaces 54 having walls which face the inside ends of the orifices 3 and facilitates formation of an ice bridge between the baffle 52 and the orifices 3. The number and size of the orifices 3, the dimensions of the body member 51 and the precise form of the baffle 52 can be varied in accordance with a design principle well known to those skilled in the art.

Careful attention to orifice diameter and the setting of the pressure switch in the pneumatic circuit, which will be referred to in more detail below, can result in a full signal sequence being achieved with 50% blockage of the orifices by ice, an essential feature in non-directional icing detectors which are required to operate in air currents caused by either wind or movement of the installation as a whole. This is so because, under conditions of moderately high flight speeds in the case of an airborne installation or of high wind speeds in the case of a ground installation, the accretion of ice on the probes will be produced by direct impingement of water droplets than by the sucking action used to cause blocking of the orifices by ice at low or zero relative velocity. It is obvious therefore that under these high speed conditions no more than 50% of the probe's surface area can be subjected to direct impingement from which it follows that, for satisfactory operation, it is essential that the detector device be actuated by only 50% blockage of the orifices by ice.

Referring to Figure 4, the invention is there shown as comprising (i) two probes having heaters, shown in the block A, (ii) a vacuum pump means shown in the block B, (iii) a pneumatic conduit means, including a reversing valve, connecting the probes to the pump ports, shown in block C, (iv) a pressure differential sensitive means, shown in block D, connected between the two sides of the pneumatic circuit and adapted, when the pressure differential therebetween has increased to a predetermined level, to cause reversal of the position of the valve, energization of the heater of the probe which prior to the reversal was connected to the pump inlet port and to actuate an indicating device and/or de-icing equipment. As shown, the pressure differential sensitive means itself comprises a diaphragm type pressure switch generally indicated at 25, a flip-flop type switching circuit, shown in the block D', adapted to alternate between two positions in response to a signal, and an indicating device generally represented at 33, the term "indicating device" for the purposes of this disclosure and claims appended thereto being understood to include visual, aural or other devices for giving data. In addition to these components, a source of electric power shown as a battery 30 is required, one terminal of which may conveniently be grounded and the other connected to the circuit through a fuse 31 and switch 32.

Referring now to the details shown in Figure 4 where a particular embodiment of the invention as a whole is disclosed, the probes 1 and 2 having orifices 3, 4 and heaters 5, 6 respectively, are by means of pneumatic conduits 9 and 10 connected to a reversing valve generally represented at 11, the other side of which is in turn connected to the inlet and outlet ports 13, 14 of a vacuum pump 12 by means of conduits 15 and 16 respectively. Pump 12 may be conveniently driven by an electrical motor indicated at 17. The reversing valve 11 is adapted to be actuated by a solenoid driving means generally indicated at 18, and having a coil 19, whereby the valve alternates between a first position (shown in the solid lines) wherein probe 1 is connected to the inlet port 13 and probe 2 is connected to the outlet port 14 and a second position (shown in phantom) wherein probe 1 is connected to the outlet port 14 and probe 2 is connected to the inlet port 13. It is obvious that by providing a solenoid having a spring return action one of the two positions will occur when the solenoid coil 19 is energised and the other position when it is not. In the particular arrangement of pneumatic and electrical circuitry shown in Figure 4, the valve 11 will be in its first position when the coil 19 is not energized, and in its second position when current does pass through the coil. It is clear also from the drawings that when the reversing valve is in the first position, air is sucked in through the orifices 3 of probe 1 and blown out through the orifices 4 of probe 2. This means that, during this "first position" part of the operating cycle, probe 1 is the "detector probe." Correspondingly, when the valve is in the second position, air is drawn in through the orifices 4 of probe 2 and blown out through the orifices 3 of probe 1 so that in this condition probe 2 is the "detector probe."

At points on the conduits 15, 16 adjacent the pump ports 13 and 14 further conduit members 21 and 22 respectively lead to the chambers 23, 24 of a diaphragm-type pressure switch generally represented at 25 having a diaphragm 26 and switch contacts 27, 28 adapted to close when the pressure differential between the chambers 23, 24 has increased to a predetermined minimum value. As shown contact 27 is connected to the battery, and the contact 28 is connected to one terminal of the indicating device 33, the other side of which is grounded, so that when contacts 27, 28 close, the indicating device is actuated.

This pressure switch 25, together with the other parts of the electrical circuitry shown in the block D, comprise a pressure differential sensitive means which, when the pressure differential between the conduits 15 and 16 has increased to a predetermined value, causes a reversal of the air flow through a change of position of the valve 11, energization of the electric heater in the probe connected to the inlet port 13 immediately prior to the reversal, and actuation of an indicator device 33. This action is accomplished by use of a flip-flop type of switching circuit which, in the embodiment shown in Figure 4 comprises a ratchet relay generally represented at 35 having a coil 36 and an armature operated ratchet 37, pawl 60 and cam arrangement whereby a single pole single throw switch 38, and a single pole double throw switch 39 are each simultaneously alternated between a first position ("down" in Figure 4) and a second position ("up" in Figure 4) which correspond with the first and second positions respectively of the reversing valve 11, and a further relay generally represented at 40 having a winding 41 adapted to cause closure of a single pole single throw switch 42.

The remaining parts of the embodiment shown in Figure 4 comprise connections (*a*) between one terminal of heaters 5 and 6 to the "up" and "down" contacts of switch 39, (*b*) between contact 28 and one terminal of coils 36, 41, (*c*) between the fuse 31 and both the pole contacts of both switch 38 and (through switch 42) the pole contact of switch 39, and (*d*) between the other contact of switch 38 and one terminal of coil 19. As clearly shown in the drawing, the other terminals of each of heaters 5, 6, and coils 19, 36 and 41 are connected to ground.

The operation of the device is as follows, reference being made to both Figure 4 and to Figure 3 wherein a graph is shown giving variations in time of the pressure differential applied to the switch 25. In the example shown, the pressure switch characteristics are such that the contacts will close when a differential of −20 inches of water is achieved, the zero reference pressure level here being arbitrarily chosen as that at the pump outlet port 14 which is connected to chamber 24. Assuming that the device commences operation at time S in position 1, so that air is being sucked in the orifices 3 of probe 1 and blown out of the orifices 4 of probe 2, and assuming that for the time being no icing conditions are encountered, the pressure in conduit 15 will be at the level −10, as shown at time S on Figure 3. This pressure differential is insufficient to cause closure of the switch contacts 27, 28. At time I, however, icing commences and progressively blocks the orifices 3 of probe 1, no appreciable icing effect being present at probe 2 since air is passing outwardly through its orifices 4. As the icing on probe 1 progresses, ice accretion closes off more and more of the available air passages through the orifices 3 and the pressure differential begins to increase as shown by the downwardly sloping line which commences at time I. When, at time J this differential reaches the predetermined level, −20 inches of water, the switch contacts 27, 28 close. This energises the coils 36, 41 of both relays 35, 40 and the indicating device 33, the latter providing a warning that icing conditions have been encountered and, if desired, automatically actuating main de-icing equipment. Energisation of relay 40 causes closure of single pole single throw switch 42 so that the pole of the single pole double throw switch 39 associated with the ratchet relay 35 is connected to the power supply. Energisation of the coil 36 of the ratchet relay 35 causes a shift from the first ("down") position of the switches 38, 39 to the second ("up") position with the result that the single pole double throw switch 39 causes energisation of the heater 5 of probe 1 and the single pole single throw switch 38 causes energisation of the winding 19 of solenoid 18. The latter makes the valve 11 change to the alternate position 2, thereby causing air to be drawn in through the unblocked orifices of probe 2.

Figure 3:
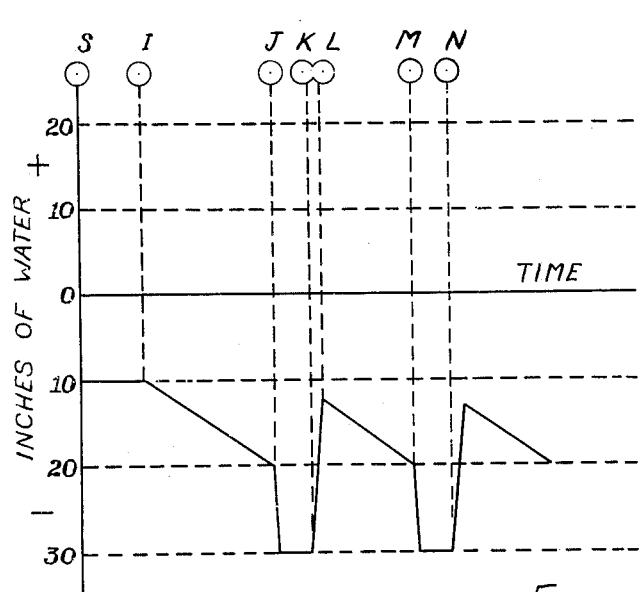
Figure 3 is a diagram showing the pressure differential across the pressure switch throughout the cycle of operation of an icing detector made in accordance with the invention.

Because the orifices 3 of probe 1 may be wholly or partially blocked by the as yet unmelted ice, this reversal of the valve 11 causes an abrupt increase in the pressure differential across the switch 25 such increase being indicated on Figure 3 by the substantially vertical line commencing at time J. This higher value (shown as −30 in Figure 3) is maintained until such time as the combined action of the heater 5 of probe 1, and the above atmospheric pressure inside the probe which tends to blow off the ice, has cleared the orifices 3 and causes the pressure differential to drop as shown by the line commencing at time K. If icing conditions are still present, the pressure differential will not drop to its original value at time S (i.e. −10) but will fall to some value (say −12) slightly greater than the original value due to ice accretion which has already taken place on probe 2, which during this part of the cycle is acting as a detector probe. As the pressure differential falls, from time K to L, it will pass through some point at which the contacts of a switch 25 open, thereby de-energising the indicating device 33 and coil 41 so as to open switch 42 and cut off power to the heater 5 of probe 1. Ratchet relay 35, however, remains in the same position since movement between the two positions thereof is caused only by the initiation, and not termination, of current flow in the winding 36.

The second half of the complete cycle of operation of the invention now commences as shown at time L on Figure 3. During this part of the cycle air is drawn in through orifices 4 of probe 2 and probe 2 is, therefore, the "detector" probe. As ice accretion thereon occurs the pressure differential across switch 25 again increases as well as shown by the sloping line between times L and M so that when the −20 level is once more achieved switch contacts 27, 28 close. This causes energisation of coil 41, thereby closing switch 42, energisation of the indicator device 33, and energisation of the winding 36 of ratchet relay 35, thereby causing a shift of both switches 38, 39 to position 1 ("down" in Figure 4) with the result that the solenoid winding 19 is de-energised and causes a change of the valve 11 from position 2 to position 1. Again, this sudden reversal of air flow caused by movement of the valve increases abruptly the differential of pressure between chambers 23, 24 of switch 30, as indicated by the vertical line commencing at time M. Similar to the action discussed above, this higher level of pressure differential is maintained until such time as the ice on probe 2 is removed by the combined action of the heater 6 therein and the air being forced out through the orifices 4. When these orifices become clear of ice the pressure differential falls, as shown by the line commencing at time N and, as before reaches some minimum value slightly above the −10 level. The device is now back in substantially the same condition as it was at time S, except that a certain amount of ice deposited on probe 1 has already increased the pressure differential from the original value −10 to some other value (say −12) as shown, this value of course being insufficient to close the pressure switch contacts. The cycle of operation will then continue until such time as ice producing conditions are no longer encountered.

As will be apparent to those skilled in the art the pneumatic and electrical circuit elements used for the invention can be varied considerably and still yield satisfactory results. More particularly, elements shown within block D' comprise only one type of a so-called "flip-flop" circuit arrangement capable of shifting alternately between a first position and a second position in response to a current actuating signal. For this reason it is obvious that a flip-flop circuit of the Eccles-Jordon type, perhaps miniaturised by the use of transistors, could be applied satisfactorily for use in the invention. Similarly, a number of possible arrangements may be resorted to for actuating the reversing valve 11 so that it alternates between the first and second positions shown.

What we claim as our invention is:

1. An icing detector comprising: two orifice type icing detector probes adapted to be progressively blocked by ice when air from ice-producing atmosphere is sucked in through the orifices thereof; a heater associated with each of said probes, and adapted to be energised to de-ice the probes; air pump means having inlet and outlet ports; means for connecting one of said probes to the inlet port and the other of said probes to the outlet port; means for reversing the said connections; and pressure differential sensitive means adapted, when the pressure differential between said connecting means has increased to a predetermined value, to cause reversal of the connections and to energise an indicating device and the heater of the probe connected to the inlet port prior to said reversal.

2. An icing detector comprising: first and second probes having orifices adapted to become progressively blocked with ice when air from ice producing atmosphere is sucked in through the probes; heater means associated with said probes and adapted, when energised, to melt ice blocking the orifices; a vacuum pump having inlet and outlet ports; connecting means providing reversible pneumatic connections between the ports and the probes, said means adapted to alternate said connections between one position wherein the first probe is connected to the inlet port and the second probe is connected to the outlet port and a second position wherein the first probe is connected to the outlet port and the second probe is connected to the inlet port; and pressure differential sensitive means adapted to cause (a) a reversal of said connections, (b) energisation of the heater of the probe connected to the inlet port prior to said reversal and (c) activation of an indicator device, when, due to ice formation on said last mentioned probe, the pressure differential between the ports has increased to a predetermined value.

3. An icing detector comprising: first and second orifice type icing detector probes each having heaters adapted to be energised for de-icing the probe; a vacuum pump having inlet and outlet ports; pneumatic conduit means, including a solenoid operated reversing valve, connecting the probes to the port whereby when the solenoid is not energised the valve is in a first position wherein the first probe is connected to the inlet port and the second probe is connected to the outlet port and when the solenoid is energised the valve is in a second position wherein the first probe is connected to the outlet port and the second probe is connected to the inlet port; a pressure switch connected between the pneumatic conduit means adjacent the pump ports, said pressure switch having contacts adapted to be closed when the pressure differential across the switch has increased to a predetermined value; flip-flop switching means adapted to alternate between first and second positions, respectively corresponding to the first and second positions of the valve in response to the initiation of a switching signal; means whereby a switching signal is initiated and transmitted to said flip-flop switching means upon closure of said pressure switch contacts; said flip-flop switching means adapted, when the pressure switch contacts are closed, to energise the first and second heaters when the switch is in the second and first positions respectively; said flip-flop switch means also adapted, when in the second position, to energise the solenoid; and indicator means actuated by closure of the pressure switch contacts.

4. The device as claimed in claim 3 wherein the energising current for the heaters is fed to the flip-flop switching means through a relay actuated by closure of the pressure switch contacts.

5. A device as claimed in claim 4 wherein the flip-flop switch means comprises a ratchet relay.

6. An icing detector comprising: first and second orifice type icing detector probes, heater means associated with each of the probes; vacuum pump means having inlet and outlet ports; a reversing valve having a first position and a second position; pneumatic conduits connecting the probes to the ports through the reversing valve whereby in its first position the first probe is connected to the inlet port and the second probe is connected to the outlet port and in its second position the second probe is connected to the inlet port and the first probe is connected to the outlet port; reversing valve driving means adapted, when actuated, to change the valve from one of the positions to the other position; and pressure differential sensitive means connected between the conduits, and adapted, when the pressure difference therebetween has risen to the predetermined value, to actuate the driving means, energise the heater of the probe connected to the inlet port prior to said actuation, and energise an indicating device.

7. An icing detector comprising: first and second probes having orifices adapted to be progressively blocked by ice when air is sucked in through the orifices from atmosphere conducive to ice formation; heater means associated with each of the probes adapted to de-ice the probes; vacuum pump means having inlet and outlet ports; pneumatic connections between the ports and the probes, said connections including a flow-reversing valve adapted to alternate between a first position wherein the first probe is connected to the inlet port and the second probe is connected to the outlet port, and a second position wherein the first probe is connected to the outlet port and the second probe is connected to the inlet port; and pressure differential responsive means adapted to reverse the position of the flow-reversal valve and to energise the heater in the probe connected to the inlet port before said reversal when, due to ice blockage of the orifices in said last mentioned probe, the pressure differential between the inlet and outlet ports has increased to a predetermined value.

8. An icing detector comprising: first and second detector probes having orifices adapted to become progressively blocked with ice when air from ice producing atmosphere is sucked in through the orifices; first and second heater means respectively associated with the first and second probes and adapted, when energised, to de-ice the probes; a vacuum pump having inlet and outlet ports; pneumatic connecting means, including a flow-reversal valve, connecting the probes to the ports, said flow-reversal valve having solenoid electrical means adapted to change the position of the valve and cause the same to alternate between a first position wherein the first probe is connected to the inlet port and the second probe is connected to the outlet port and a second position wherein the first probe is connected to the outlet port and the second probe is connected to the inlet port; a pressure switch connected between the pneumatic conduit means at points thereon adjacent the pump ports, said pressure switch having electrical contacts adapted to be closed when the pressure differential across the switch has increased to a predetermined value; a ratchet relay means having a winding, and adapted upon initiation of current flow in the winding to alternate simultaneously single pole, double throw and single pole single throw switches between first and second positions, said first and second positions corresponding respectively with the first and second positions of the reversing valve; an electric indicator device; a further relay having a winding and two contacts adapted to be closed when the winding is energised; a source of electric power; electric conductor means whereby when the pressure switch contacts are closed the relay windings and the indicator device are energised; electric conductor means whereby when the contacts of the other relay are closed, the single pole double throw switch causes energisation of the first and second heaters when the switch is in the second and first positions respectively; and further electrical conductor means whereby the single pole throw switch causes energisation of the solenoid winding when the said single pole single throw switch is in its second position.

References Cited in the file of this patent

UNITED STATES PATENTS

| | | |
|---|---|---|
| 2,699,537 | Sederstrom | Jan. 11, 1955 |
| 2,739,302 | Timbie | Mar. 20, 1956 |
| 2,820,958 | Fraser | Jan. 21, 1958 |